United States Patent [19]
Beaton et al.

[11] 4,092,962
[45] June 6, 1978

[54] PRECARBURETOR IGNITION SYSTEM

[75] Inventors: Arthur L. Beaton; Nelson E. Weygant, both of St. Petersburg, Fla.

[73] Assignee: Steven P. Corrigan, Omaha, Nebr.

[21] Appl. No.: 672,723

[22] Filed: Apr. 1, 1976

Related U.S. Application Data

[63] Continuation-in-part of Ser. No. 508,273, Sep. 23, 1974, abandoned.

[51] Int. Cl.² ............................................ F02M 31/00
[52] U.S. Cl. ................................ 123/133; 123/122 E
[58] Field of Search ................ 123/133, 34 A, 122 E, 123/141; 261/144, 145

[56] References Cited

U.S. PATENT DOCUMENTS

| 1,625,997 | 4/1927 | Gronkwist | 123/133 |
| 3,227,427 | 1/1966 | Wells | 123/133 |
| 3,913,543 | 10/1975 | Richard | 123/122 E |

Primary Examiner—Ronald H. Lazarus
Attorney, Agent, or Firm—John Orman

[57] ABSTRACT

This invention relates to a pre-ignition, combustion system of the type used in combination with an internal combustion engine whereby a vaporized fuel charge is created due to the exposure of heat to saturated fuel vapor. The fuel vapor is further heated to a point of near combustion immediately prior to introduction into the intake manifold of an I. C. engine. A thermerator element is provided which defines a heating chamber in which fuel is vaporized due to direct exposure with the exhaust gases of the internal combustion engine through appropriate directing of the introduced fuel or fuel vapor in direct heat transfer relation to the exhaust gases passing through at least a portion of the heating chamber defined in the thermerator. The fuel source including a substantially conventional fuel tank has air supply means leading thereto so as to supply positive air pressure serving to aid fuel passing from the fuel tank into the thermerator through a first fuel supply conduit. At least one additional auxiliary fuel supply line with fuel pump attached thereto is provided for directing fuel into the thermerator on an auxiliary or independent basis.

5 Claims, 11 Drawing Figures

U.S. Patent   June 6, 1978   4,092,962
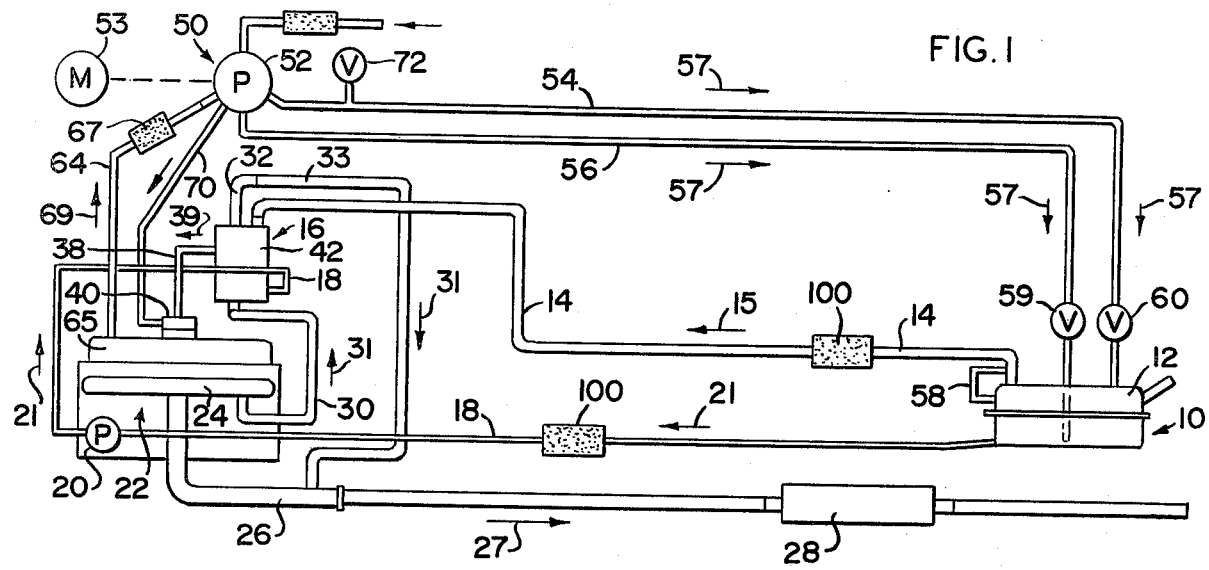
FIG. 1
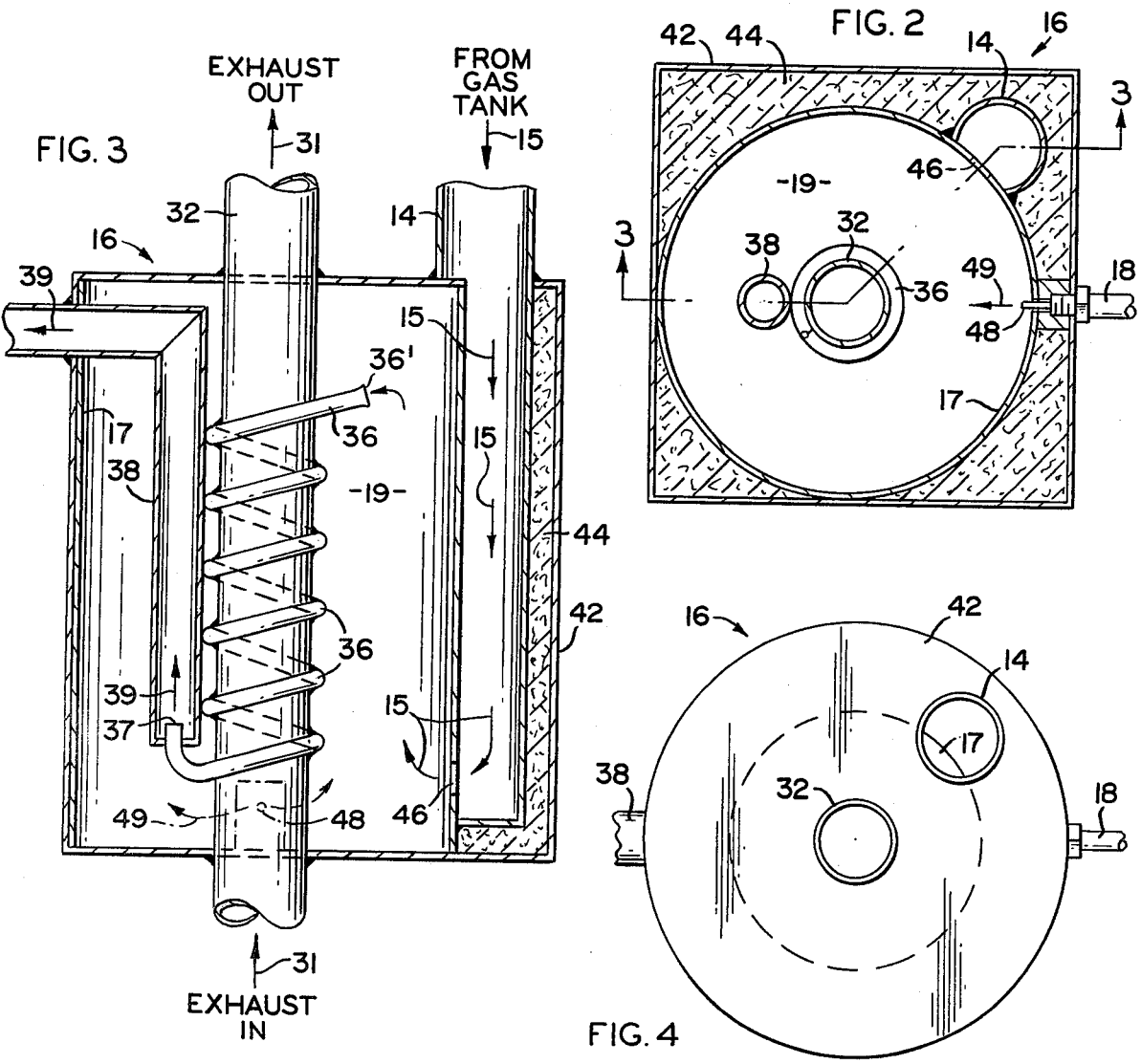
FIG. 3
FIG. 2
FIG. 4

PRECARBURETOR IGNITION SYSTEM

This is a continuation-in-part application of presently pending U.S. application Ser. No. 508,273 filed on Sept. 23, 1974 now abandoned for a Precarburetor Ignition System.

BACKGROUND OF THE INVENTION

1. Field of the Invention

This invention relates to a system for preheating the combustible fuel into a vapor state and to a temperature near combustion immediately prior to introduction into the intake manifold and mixed with a predetermined amount of air, which itself may be preheated.

2. Description of the Prior Art

Since the advent of the internal combustion engine and its particular application to automobiles there has been a constant attempt to render the internal combustion engine more efficient in terms of both performance characteristics and fuel consumption. In very recent years, new emphasis on environmental control has placed an additional burden on designers of internal combustion engines since the vast majority of most devices designed to free pollutants from the exhaust of internal combustion engines have a negative effect on the performance and fuel consumption of the engine.

Fuel consumption per se has also very recently become a very important problem due to the fact that most countries throughout the world have suffered fuel shortages primarily in the petroleum based fuel products such as gasoline, etc.

In order to overcome the various problems associated with an I. C. engine, especially in the area of fuel consumption, numerous devices have been developed relating to the precarburetion treatment of the fuel charge immediately prior to entering the intake manifold and/or the combustion cylinder of the I. C. engine. The majority of these devices are generally aimed at increasing the maximum amount of energy available from any given quantity of fuel since it is well recognized that the I. C. engine as presently used in the automobile is highly inefficient.

In order to understand the problems associated with efficient development of I. C. engines and especially their combustion characteristics, it is important to understand the basics of combustion in the surrounding environment as we know it. Air, as present in the surrounding atmosphere contains approximately 78% nitrogen. Nitrogen has a negative effect on combustion in that it will not, unlike oxygen, support combustion by itself. Accordingly, a considerable amount of heat developed by present day means of combustion is directed to the raising of the temperature of nitrogen when combustion takes place in the surrounding air instead of in a purely oxygen environment. In the combustion process, the part of the heat directed to the heatinng up of the nitrogen is obviously considered a loss since it performs no useful function. It necessarily limits the temperature that is normally reached by combustion. However, nitrogen does have an advantageous characteristic in that it prevents the obvious, too rapid ignition or combustion that would occur if the surrounding atmosphere were made up of 100% oxygen or even a much greater percentage of oxygen. Normally, oxygen comprises approximately 21% of the surrounding atmosphere.

Gasoline and similar petroleum based fuels primarily contain carbon and hydrogen. These elements are, of course, nonmetallic, are combustible and have an affinity to oxygen. Oxygen, having a stronger affinity for hydrogen unites with it first, serving to set the carbon atom free. Solid residues or particles of free carbon are released in the midst of burning hydrogen and are raised to the state of incandescence during combustion. Carbon, however, does unite with oxygen and forms either carbon dioxide ($CO_2$) or carbon monoxide (CO). These normally are prevalent in the exhaust gases of an I. C. engine unless treated. In the typical combustion cycle in an I. C. engine, the lack of enough air or the presence of too much carbon will result in incomplete combustion which, in turn, creates a pollutant laden exhaust gas and/or carbon particles forming in the I. C. engine itself. In addition, the scarcity of oxygen needed to supply each atom of carbon liberated during combustion results in the formation of carbon monoxide thus, in turn, resulting in lower heat when all the carbon is not burned. Naturally, the free carbon deposited in the I. C. engine is responsible for engine wear and other derrogatory effects normally present in inefficiently operated or improperly carbureted I. C. engines.

Accordingly, based on experimentation, it is logical that more efficient results and true combustion is enhanced if the combustible elements present in the fuel charge have been prepared to a temperature near combustion immediately prior to exposure to the combustion cylinder or intake manifold of an I. C. engine. In addition, due to the natural draw of an I. C. engine during operation, it would be possible for vaporization of the fuel charge to be created and mixed with a predetermined amount of air whereby the mixture of preheated air and preheated fuel vapor be drawn in upon demand of the engine. In that no large liquid particles exist throughout the charge, a more exacting mixture can easily be achieved. It stands to reason that the introduction of heated vapors at the combustible temperature assures the maximum amount of energy from a smaller volume of air/gas mixture that has been expanded because of exposure to great amounts of heat. Many existing applications or modifications of present day I. C. engines including certain "modern" combustion systems, ignore factors that would enable better gas mileage and efficient fuel consumption. Perhaps the greatest blunder is to discount the value of nitrogen. Since a combustible mixture contains anywhere from 72–75% nitrogen as it passes through the combustion process it cannot be ignored since it has been considered a deterrent to proper combustion. If nitrogen were eliminated from the fuel mixture combustion could be predictably measured and near perfect combustion would be easily achieved. Since nitrogen is forever present, it must be considered an asset in that it singularly controls too rapid combustion or oxidation.

SUMMARY OF THE INVENTION

The present invention is directed to a precarburetor ignition, or more precisely a pre-ignition combustion system which incorporates the passing of a volume of air taken from atmosphere through a liquid fuel to the effect of completely saturating the air. The saturated air and combined fuel vapor is then directed to a thermerator means wherein the mixture is heated due to direct exposure to the exhaust gases from the I. C. engine thereby greatly expandinng its volume. Greater efficiency results due to the fact that the nitrogen in the combustible mixture or fuel charge is preheated from a heat source other than the combustion process itself to a point where, upon ignition of the fuel charge, the existing temperature of the nitrogen does not significantly take away from the energy generated by the combustion. Less heat is lost through the heating of the nitrogen component of the fuel mixture since it has already been preheated. The result is the release of the maximum amount of energy in the form of heat of any given fuel providing much greater economy and enabling the engine to operate more efficiently.

Specifically, a fuel source means is housed in a conventional fuel tank mounted on an automobile or the like wherein a supply of air from atmosphere is directed into the fuel tank so as to become saturated with the liquid fuel contained therein. A first fuel supply conduit is interconnected in fluid communication between a thermerator and the fuel tank. Saturated fuel vapor passes through this conduit and is exited directly into the heating chamber defined by the thermerator. More specifically, the heating chamber is surrounded by a housing of the thermerator and insulation material may be disposed in surrounding relation to the heating chamber so as to capture heat or maintain heat for as long as possible, therein. A heat source in the form of an exhaust conduit having exhaust gases from the I. C. engine is mounted at least in part on the interior of the chamber wherein a constant flow of exhaust gases, during operation of the I. C. engine passes therethrough thereby generating heat throughout the entire heating chamber in direct exposure with the vaporized fuel. In addition, a fuel receiving means in the form of a receiving tube is disposed on the interior of the chamber in direct engagement with the exhaust conduit. One embodiment of the present invention comprises the receiving tube wound in a spiral-like configuration in substantially surrounding and engaging relation to the exterior of the conduit. In another embodiment of the present invention, the receiving tube is wound into a coil and disposed within the interior of the conduit. Heat transfer between the fuel vapor passing through the receiving tube from the exhaust gases passing through the exhaust conduit occurs efficiently thereby preheating the vaporized fuel to a point of near combustion. The fuel is directed from the receiving tube again through the thermerator and eventually to proper conduit means leading to the intake manifold.

Air supply means including an air delivery system or means in the form of a pump disposed in fluid regulating position between a supply of air coming from the crank case and an air supply conduit leading from the pump to the intake manifold to an area where mixture can occur between the incoming preheated air, from the crank case, and the vaporized fuel coming from the thermerator.

As stated above, adequate or predetermined amounts of fuel can be drawn into the ignition cylinder or chamber of the I. C. engine due to the natural draw or demand of the engine during its operation. The pump means arranged in the air supply and air delivery system is provided to supply predetermined quantities of air as needed to regulate the mixture of the fuel charge immediately prior to ignition. An auxiliary fuel supply line is further arranged in interconnected relation between the fuel tank and the thermerator to supply auxiliary or independent fuel other than through the primary fuel supply conduit previously set forth above.

One of the numerous advantages resulting from operation and use of the present invention is an elimination or substantial reduction in the pollutant, carbon monoxide (CO), from the exhaust gases passing into the atmosphere. More specifically, experimental operation of the present system has resulted in substantially 100% illumination of CO from the exhaust gases when the I. C. engine on which the system is used is operated at a substantially constant R.P.M. This, of course, is normally the case when the I. C. engine is used for a stated application. When an I. C. engine incorporating the subject pre-combustion system is used in an automobile application, reduction of the content of CO in the exhaust is reduced more than 98% over conventional pollution control systems presently available.

The structure utilized in the present system is further capable of operating an I. C. engine efficiently on gasoline of much lower grade than presently utilized. Due to the fact that lower grade gasoline, in fact, vaporizes at a much lower temperature, greater efficiency will result in utilization of said "lower grade" gasoline with the system of the present invention.

This invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention reference should be had to the following detailed description taken in connection with the accompanying drawings in which:

FIG. 1 is a schematic view showing the basic structural features and the interrelationship of elements comprising the present invention.

FIG. 2 is a top sectional view of the thermerator of the present invention and the interior of the heating chamber defined thereby.

FIG. 3 is a side sectional view showing the details of the thermerator, heat source and heating chamber in cooperative relation to one another.

FIG. 4 is a top plan view of the thermerator showing an alternative cylindrical configuration of the exterior housing of the thermerator.

FIG. 5 is a schematic view of yet another embodiment of the present invention incorporating a fuel vapor separator unit.

FIG. 6 is a schematic view with the vapor separator unit shown in detail.

FIG. 7 is a sectional view showing details of another embodiment of the thermerator structure.

FIG. 8 is a sectional view of another embodiment of the thermerator means.

FIG. 9 is a top, partial cutaway view of yet another embodiment of the thermerator means.

FIGS. 10 and 10a are partial cutaway views in section showing disposition of the coil element or a fuel carrying conduit on the interior of the thermerator casing.

Similar reference characters refer to similar parts throughout the several views of the drawings.

DETAILED DESCRIPTION

As shown in FIG. 1 in schematic format, the pre-carburetor ignition system of the present invention comprises a fuel supply source generally indicated as 10 including a tank means 12 interconnected in fluid communication by virtue of a first fuel supply conduit means 14 to the thermerator generally indicated as 16. An auxiliary fuel supply means in the form of a secondary conduit or the like 18 is also interconnected in fluid communication between tank 12 and thermerator 16. A fuel pump 20 is connected in fluid regulating disposition relative to the fluid passing through auxiliary line 18. Fluid flow therein is, of course, indicated by directional arrows 21. The internal combustion engine itself, although not per se a part of the present invention, is generally indicated as 22 and includes an exhaust manifold 24 having a primary exhaust line 26 exiting therefrom and arranged in fluid communication with a conventional muffler or the like 28 as the exhaust gas passes through conduit 26 as indicated by directional arrow 27. Exhaust conduit means 30 removes heated exhaust gas from exhaust manifold 24 and directs it through exhaust conduit 32 mounted at least in part on the interior of thermerator 16 defined by housing 17. The interior of housing 17 in turn defines heating chamber 19. It should be noted that the portion of the exhaust conduit indicated in FIG. 1 as 33 is arranged in a closed fluid flow relation to the exhaust system as indicated by directional arrows 31 such that exhaust gas exiting from manifold 24 passes through line 30 into the thermerator and through exhaust conduit 32 where heat exchange takes place. From there the exhaust gases pass through line 33 back into main exhaust conduits 26 into the normal flow of the exhaust gases as indicated by line 27 normally exiting from manifold 24. A closed fluid flow system is thereby defined. With reference to FIG. 2, supply line 14 passes into the interior of chamber 19 and exits the vaporized fuel from tank 12 as indicated by directional arrows 15 directly into fluid contact with the exhaust conduit 32. A fuel receiving means in the form of receiving tube 36 is mounted on the interior of chamber 19 in direct contact with fluid conduit 32. Specifically, the receiving tube 36 has a substantially spiral like configuration and is brazed to the outer periphery of tube 32 so as to accomplish maximum heat transfer therefrom. Entrance of receiving tube 36, indicated herein as 36', is open to the interior of chamber 19 and receives the vaporized fuel directly therefrom. The opposite end of receiving tube 36 indicated as 37 is arranged in fluid communication with exit line 38. As indicated by directional arrows 39, the preheated and vaporized fuel passes through line 38 into intake manifold 40. With regard to FIG. 2, the thermerator 16 comprises an exterior housing 42 arranged in surrounding relation to insulation material 44. This insulation material is in turn arranged in surrounding relation to the chamber 19 defined by sidewall 17. Fuel supply conduit 14 exits into chamber 19 as indicated in both FIG. 2 and 3 at aperture 46 as clearly indicated. Auxiliary fuel supply line 18 exits at 48 as indicated by directional arrow 49 into chamber 19.

While the embodiment of FIG. 3 is disclosed as exhaust conduit 32 on the interior of the housing 17, it should be noted that an important feature of this invention comprises proper disposition of the conduit 32 relative to the saturated fuel vapors in chamber 19, so as to permit proper heat transfer. Accordingly, it is emphasized that another embodiment of the present invention comprises the exhaust gases flowing on the exterior of conduits 14, 36 and 38. More specifically, the exhaust conduit could be deposited on the exterior surrounding relation thereto, in such a manner as to accomplish the desired heat transfer. Similarly, the housing 17 could comprise the boundaries of the exhaust conduit 32 itself thereby allowing the exhaust gases to pass in direct exposure to the fuel vapor conduits as shown. Proper sealing of the fuel vapor conduit would have to be accomplished to prevent fuel vapor from passing out of the thermerator along with the exhaust gases. These embodiments discussed above would be possibly more adaptable to new auto manufacture.

Air supply means is generally indicated as 50 and comprises pump means 52 connected to the plurality of lines or conduits used to direct air to various portions of the system. Specifically, conduits 54 and 56 are interconnected in fluid communication between pump 52 and tank 12. Flow of air therebetween is indicated by directional arrows 56. The connection of supply lines 54 and 56 are located at different points on the interior of the tank 12 so as to provide proper saturation of air entering into the tank and intermixture with the liquid fuel contained therein. Vent line 59 is arranged in a loop-like communicating relation between fuel supply line 14 and the interior of tank 12 itself. This is to prevent either positive or negative pressure from building up in the tank whereby vent line 58 serves to connect the interior thereof to the draw of the line fed into thermerator 16. Check valves 59 and 60 are provided to regulate fluid flow in the single direction indicated by directional arrows 57 and prevent backup in lines 54 and 56. As set forth above, due to the saturation of the air entering the tank 12 because of its intermixture with the liquid fuel contained therein the vaporized fuel mixture passing through line 14 into thermerator 16 is already in a partially vaporized state. The exposure to significant amounts of heat will further maintain the fuel in a completely vaporized state and raise the temperature to a point near combustion as it is being passed through line 38 into the intake manifold 40.

Pump 52 may be driven by any conventional auxiliary type motor represented generally as 53 which is interconnected to pump means 52 in driving relation thereto. The air supply means further comprises additional air delivery system means comprising air delivery conduit 64 interconnected in fluid communication between crank case 65 of the I.C. engine and the pump means itself 52. A conventional air filter 67 may be placed in fluid interruptive relation relative to the air passing from crank case 65 through line 64 as indicated by directional arrow 69. Since the air is coming from the crank case it is preheated to a certain extent and, after being directed from pump 52, this preheated air is directed through line 70 into the intake manifold 40 where it is mixed, prior to ignition, with the vaporized, preheated fuel change coming from thermerator 16.

Proper vent valve means or escape vent structure 72 may be provided at various points throughout the air supply and air delivery system as indicated in FIG. 1 to eliminate any unnecessary positive or negative pressure buildup in these lines.

Another feature of the present invention comprises the addition of a fuel content regulator means generally indicated as 100. This regulator means comprises a porous material "filter" element disposed in the path of the fuel lines 14 and 18 in interruptive relation to the fuel vapor passing therethrough. More particularly, regulator means 100 may include a ceramic material element originally placed in a saturated or semi-saturated state with liquid fuel, disposed in direct contact with the fuel vapor passing from tank 12 to thermerator 16. This porous regulator element in its saturated state serves to add or delete fuel content from the vapor passing from the tank. Accordingly, the mixture or content of fuel in the fuel vapor is regulated independent of the amount of liquid fuel in the tank 12.

As shown in FIGS. 5 and 6 a vapor separator unit is generally indicated as 80 and is interconnected in direct fluid communication with tank 12 by conduit 81. A fluid pump 82 may be positioned in conduit 81 between tank 21 and separator unit 80 so as to force gasoline from the tank into the separator unit as explained in greater detail hereinafter. Similarly, a return conduit 83 is disposed in fluid communication between the separator unit 80 and tank 12. Pump means 84 may be positioned in fluid communication with conduit 83 so as to force any unused gasoline from a reservoir portion of the separator unit back into the gasoline tank for maximum efficiency. It should be noted that the pump unit 82 may comprise the normal fuel pump associated with the automobile engine or alternately may comprise an auxiliary pump member.

With reference to FIG. 6 the separator unit 80 comprises a generally curvilinear longitudinal configuration which includes a tail portion 85 disposed in direct communication with the remainder of the separator unit. The tail portion serves as a reservoir to collect unused fuel which has again liquefied for return through conduit 83 and pump 84 to gasoline storage tank 12.

Interconnection between conduit 81 and the interior of the separator unit 80 is by means of an oriface spray assembly generally indicated as 87 disposed on the curvilinear portion of the separator unit 80 so as to direct the fuel coming through conduit 81 and tank 12 onto the oppositely disposed curvilinear interior surface 89. It should be noted that the oriface spray means 87 should have a predetermined size and configuration so as to force the fuel from conduit 81 to exit into the interior of the separator unit 80 in a vapor type spray. Upon such delivery this vapor type spray will travel up through conduit 14 and into the thermerator generally indicated as 16. An outside air source allowing proper fluid flow to pass through separator unit 80 is generally indicated as 90 and may comprise a conduit integrally attached to the unit 80 and communicating directly with atmosphere.

Further structural features of the schematic embodiment represented in FIG. 5 includes a check valve 91 disposed in conduit 38 leading to manifold 40 to prevent reverse flow. A throttle valve is generally indicated as 93 and is disposed in fluid communication with the fuel passing from thermerator 16 to the manifold 40 and is movably mounted within conduit 38 so as to regulate fuel flow into manifold 40.

FIG. 8 is a sectional view showing the interior of the thermerator 16 with structural modifications which differ from the embodiment of FIG. 3. More specifically, connecting conduit 14' being interconnected between intake conduit 14 and fuel receiving means or conduit 36. In this embodiment represented in FIG. 8 the fuel enters the thermerator 16 through conduit 14 and passes in direct communication within heating chamber 19 to the fuel receiving means or conduit 36. Due to the fact that the fuel receiving conduit 36 is in direct engagement with the exhaust passage conduit 32 the fuel is directly heated and passed into a true vaporized state from which it is transferred into conduit 38 as indicated by directional arrow 39.

In another embodiment of the present invention as shown in FIG. 9, the thermerator 16 is defined by a portion of the exhaust conduit 32 which is formed into a cylindrical shape housing portion 100. The interior of the housing portion 100 defines a heating chamber 106. Coil conductor 102 is at end connected to conduit 14 and at the other end connected to conduit 38 so that the saturated fuel vapors can flow from conduit 14 through coil conduit 102 to conduit 38. The arrangement of the loops 104 of the coil conduit 102 can be placed in any arrangement which readily permits proper heat transfer. One good arrangement of the loops 104 is shown in FIG. 10 in which the loops 104 are arranged in adjacent side-by-side relationship to each other in a plane parallel to wall 106 of the housing portion 100. Alternately, another good arrangement of the loops 104 is an arrangement in which the plurality of loops are positioned in adjacent side-by-side disposition relative to each other in a plane diagonally disposed between the parallel walls 106 and 108 of the housing portion 100.

With more specific regard to the operation of the fuel vapor separator unit, fuel pump means 82 forces the gasoline from tank or supply 12 into and through the spray oriface means 87 connected to the curvilinear portion of the separator unit 80. Gasoline is forced into and through the small orifice which causes a spray or vapor like mist to be forced directly into the curvilinear portion of the separator unit just above air intake 90 clearly set forth in FIG. 6. The air intake or opening, of course, permits outside air to pass over and through the gasoline mist which is carried by the internal combustion engine vacuum draw to the thermerator through conduit 14. As previously explained, the fuel mist or vapor is superheated and becomes a gaseous hot vapor that enters the I.C. engine manifold by virtue of the vacuum draw normally associated with I.C. engines. The excess gasoline not passing through the upper portion into conduit 14 to the thermerator flows downward into the reservoir means. At this point a second liquid or fluid pump 84 draws off the excess fuel or gasoline collected in the reservoir and returns it to the supply or tank 12 for maximum efficiency. Accordingly, the entire system acts as a recirculating unit regarding excess gasoline or fuel not passed through the fuel vapor separator unit 80 through conduit 14 through the thermerator.

It will thus be seen that the objects set forth above, among those made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Now that the invention has been described,

What is claimed is:

1. A precarburetor ignition system for use in combination with an internal combustion engine said system comprising: thermerator means interconnected to the intake manifold of the internal combustion engine, fuel source means, fuel supply means interconnected in fluid communication between said thermerator means and said fuel source means; said fuel supply means comprising, at least in part, supply conduit means; said thermerator means comprising heat source means disposed in direct engagement with exhaust gases from the internal combustion engine; fuel vapor separator means disposed in fluid communication between said fuel supply means and said thermerator means, spray orifice means having a predetermined configuration and connected in fluid delivery position to the interior of said fluid vapor separator means, said spray orifice means dimensioned to deliver fuel from said supply means to the interior of said fuel vapor separator means in at least a partial vapor state, said fuel vapor separator means further comprising reservoir means disposed in spaced relation to the point of connection of said spray orifice means, return conduit means interconnected between said reservoir means and said fuel supply means, said fuel vapor separator means comprising, at least in part, a substantially curvilinear longitudinal configuration, said spray orifice means connected in interconnecting relation to the interior of said fuel vapor separator means and disposed in direct fuel delivery relation to an interior curved surface of said fuel vapor separator means, whereby fluid is directed into the interior of said fuel vapor separator means toward the interior curved surface, said reservoir means disposed below the interior curved surface in fluid communication with the fuel supply, whereby excess fuel collected in said reservoir is returned to said fuel supply means; said fuel vapor separator means further comprising an air intake means disposed in fluid communication with the interior of said fuel vapor separator means, whereby air is mixed with partially vaporized fuel from said spray orifice means and delivered to said thermerator for complete vaporization upon receiving heat therefrom.

2. A precarburetor ignition system as in claim 1 wherein said fuel vapor separator means is connected in direct fluid communication with said fluid receiving means, whereby fuel is directed from said fuel supply means to said thermerator through said fuel vapor separator means.

3. A precarburetor ignition system as in claim 1 wherein said reservoir means comprises an extended portion connected to said substantially curvilinear portion and in direct fluid connection therewith.

4. A precarburetor ignition system as in claim 1 further comprising valve means disposed downstream of said thermerator means in fuel regulating relation to fuel transmitted between said thermerator and the manifold of the internal combustion engine.

5. A precarburetor ignition system as in claim 1 further comprising fuel pump means disposed in fuel regulating and communicating relation between said fuel supply means and said fuel vapor separator means.

* * * * *